US011525397B2

(12) United States Patent
Leary et al.

(10) Patent No.: US 11,525,397 B2
(45) Date of Patent: Dec. 13, 2022

(54) GAS TURBINE COMPONENT WITH EJECTION CIRCUIT FOR REMOVING DEBRIS FROM COOLING AIR SUPPLY

(71) Applicant: General Electric Company, Schenectady, NY (US)

(72) Inventors: Brendon James Leary, Simpsonville, SC (US); Frederic Woodrow Roberts, Jr., Simpsonville, SC (US); Ibrahim Sezer, Greenville, SC (US); Tyler Christopher Henson, Greenville, SC (US)

(73) Assignee: General Electric Company, Schenectady, NY (US)

( * ) Notice: Subject to any disclaimer, the term of this patent is extended or adjusted under 35 U.S.C. 154(b) by 101 days.

(21) Appl. No.: 17/008,775

(22) Filed: Sep. 1, 2020

(65) Prior Publication Data
US 2022/0065165 A1 Mar. 3, 2022

(51) Int. Cl.
*F02C 7/05* (2006.01)
(52) U.S. Cl.
CPC ..................................... *F02C 7/05* (2013.01)
(58) Field of Classification Search
CPC .... F02C 7/05; F02C 7/052; F02C 7/18; F01D 5/18; F01D 5/183–189; F01D 25/002; F01D 25/32
See application file for complete search history.

(56) References Cited

U.S. PATENT DOCUMENTS

| 4,962,640 | A | 10/1990 | Tobery | |
| 5,511,937 | A * | 4/1996 | Papageorgiou | F01D 5/189 |
| | | | | 415/115 |
| 5,827,043 | A | 10/1998 | Fukuda et al. | |
| 6,508,620 | B2 | 1/2003 | Sreekanth et al. | |
| 6,874,988 | B2 | 4/2005 | Tiemann | |
| 2016/0376993 | A1* | 12/2016 | Lacko | F02K 3/06 |
| | | | | 415/116 |
| 2018/0179897 | A1* | 6/2018 | Batt | F01D 5/18 |
| 2020/0018182 | A1 | 1/2020 | Whitaker et al. | |
| 2020/0095887 | A1* | 3/2020 | Romanov | F01D 25/12 |

* cited by examiner

*Primary Examiner* — Steven M Sutherland
(74) *Attorney, Agent, or Firm* — James Pemrick; Charlotte Wilson; Hoffman Warnick LLC

(57) ABSTRACT

A gas turbine component includes an ejection circuit for removing debris from cooling air flowing through a gas turbine component. The gas turbine component includes: an impingement insert and a debris ejection circuit. The impingement insert, which is disposed within a cavity in the component, includes an end wall and distribution holes for directing cooling air against a wall of the cavity. The debris ejection circuit includes: a bypass aperture defined in the end wall, which fluidly couples an interior of the impingement insert and an end section of the cavity; and an ejection channel, which fluidly couples the end section of the cavity to the wheelspace cavity or the hot gas path. A pressure differential between the interior of the impingement insert and the wheelspace cavity or hot gas path directs debris in the cooling air through the bypass aperture and the ejection channel.

16 Claims, 5 Drawing Sheets

GAS TURBINE COMPONENT WITH EJECTION CIRCUIT FOR REMOVING DEBRIS FROM COOLING AIR SUPPLY

BACKGROUND

The disclosure relates generally to gas turbine systems and, more particularly, to an ejection circuit for removing debris from a supply of cooling air flowing through a component of a gas turbine system (e.g., a first stage nozzle).

Gas turbine systems are one example of turbomachines widely utilized in fields such as power generation. A conventional gas turbine system generally includes a compressor section, a combustor section, and a turbine section. During operation of a gas turbine system, various components in the system, such as nozzle vanes, turbine blades, and shroud segments, are subjected to high temperature gas flows, which can cause the components to fail. Since higher temperature gas flows generally result in increased performance, efficiency, and power output of a gas turbine system, it is advantageous to cool the components that are subjected to high temperature gas flows to allow the gas turbine system to operate at increased temperatures and to extend the lifetime of the components of a gas turbine system.

Cooling (e.g., impingement cooling, convection cooling, etc.) is often provided by directing a pressurized flow of a cooling fluid (e.g., air) through internal passages formed in the components of the gas turbine system. In many cases, the cooling fluid is provided by bleeding off a portion of the pressurized air discharged by the compressor section of the gas turbine system. Often, a cavity within a component of a gas turbine system (e.g., a vane of a nozzle) is fitted with a thin-walled vessel, generally referred to as an insert (e.g., an impingement insert), which is configured to distribute cooling air against the walls of the cavity to provide impingement cooling. Such inserts typically include a plurality of small distribution holes dispersed about the walls of the insert.

During operation of a gas turbine system, small particles contained in the cooling air entering the insert may accumulate in and potentially block the small distribution holes in the walls of the insert. Such blockage reduces the cooling efficiency of the insert and may lead to oxidation or other damage to portions of the insert.

SUMMARY

An aspect of the disclosure is directed to a gas turbine component with an ejection circuit for removing debris from cooling air flowing through the gas turbine component, including: an impingement insert disposed within a cavity in the gas turbine component, the impingement insert including an end wall and a plurality of distribution holes for directing cooling air against a wall of the cavity; and a debris ejection circuit, including: a bypass aperture defined in the end wall of the impingement insert, the bypass aperture fluidly coupling an interior of the impingement insert and an end section of the cavity; and an ejection channel defined in an aft section of the gas turbine component, the ejection channel fluidly coupling the end section of the cavity and a wheelspace cavity, the wheelspace cavity being radially inward of the gas turbine component; wherein a pressure differential between the interior of the gas turbine component and the wheelspace cavity directs debris in the cooling air through the bypass aperture and the ejection channel to the wheelspace cavity.

Another aspect of the disclosure is directed to a gas turbine component having an ejection circuit for removing debris from cooling air flowing through a component of a gas turbine system, the gas turbine component including: an impingement insert disposed within a cavity in the gas turbine component, the impingement insert including an end wall and a plurality of distribution holes for directing cooling air against a wall of the cavity; and a debris ejection circuit, including: a bypass aperture defined in the end wall of the impingement insert, the bypass aperture fluidly coupling an interior of the impingement insert and an end section of the cavity; and an ejection channel defined in an aft section of the gas turbine component, the ejection channel fluidly coupling the impingement insert and a hot gas path at an exterior of the gas turbine component via the bypass aperture; wherein a pressure differential between the interior of the impingement insert and the exterior of the gas turbine component directs debris in the cooling air through the bypass aperture and the ejection channel to the hot gas path at the exterior of the gas turbine component.

The illustrative aspects of the present disclosure solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

Figure 1:
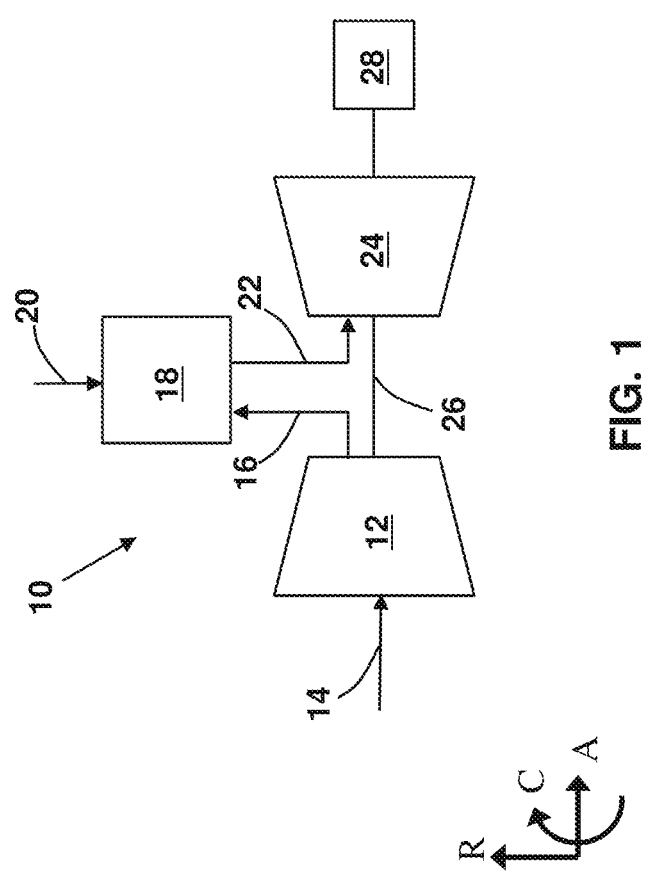
FIG. 1 depicts a schematic diagram of a gas turbine system, according to embodiments described herein.

It is noted that the drawings of the disclosure are not necessarily to scale. The drawings are intended to depict only typical aspects of the disclosure and therefore should not be considered as limiting the scope of the disclosure. In the drawings, like numbering represents like elements between the drawings.

DETAILED DESCRIPTION

Reference will now be made in detail to representative embodiments illustrated in the accompanying drawings. It should be understood that the following descriptions are not intended to limit the embodiments to one preferred embodiment. To the contrary, the disclosure is intended to cover alternatives, modifications, and equivalents as can be included within the spirit and scope of the described embodiments as defined by the appended claims.

As an initial matter, in order to clearly describe the current disclosure, it will become necessary to select certain terminology when referring to and describing relevant machine components within the scope of this disclosure. When possible, common industry terminology will be used and employed in a manner consistent with its accepted meaning.

Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

In addition, several descriptive terms may be used regularly herein, and it should prove helpful to define these terms at the onset of this section. These terms and their definitions, unless stated otherwise, are as follows. As used herein, "downstream" and "upstream" are terms that indicate a direction relative to the flow of a fluid, such as the working fluid through the turbine engine or, for example, the flow of air through the combustor or coolant through one of the turbine's component systems. The term "downstream" corresponds to the direction of flow of the fluid, and the term "upstream" refers to the direction opposite to the flow. The terms "forward" and "aft," without any further specificity, refer to directions, with "forward" referring to the front or compressor end of the engine, and "aft" referring to the rearward or turbine end of the engine. Additionally, the terms "leading" and "trailing" may be used and/or understood as being similar in description as the terms "forward" and "aft," respectively.

It is often required to describe parts that are at differing radial, axial and/or circumferential positions. The "A" axis represents an axial orientation. As used herein, the terms "axial" and/or "axially" refer to the relative position/direction of objects along axis A, which is substantially parallel with the axis of rotation of the gas turbine system (in particular, the rotor section). As further used herein, the terms "radial" and/or "radially" refer to the relative position/direction of objects along a direction "R" (see, FIGS. 1 and 2), which is substantially perpendicular with axis A and intersects axis A at only one location. Finally, the term "circumferential" refers to movement or position around axis A (e.g., direction "C").

In various embodiments, components described as being "fluidly coupled" to or "in fluid communication" with one another can be joined along one or more interfaces. In some embodiments, these interfaces can include junctions between distinct components, and, in other cases, these interfaces can include a solidly and/or integrally formed interconnection. That is, in some cases, components that are "coupled" to one another can be simultaneously formed to define a single continuous member. However, in other embodiments, these coupled components can be formed as separate members and be subsequently joined through known processes (e.g., fastening, ultrasonic welding, bonding).

When an element or layer is referred to as being "on", "engaged to", "connected to" or "coupled to" another element, it may be directly on, engaged to, connected to, or coupled to the other element, or intervening elements may be present. In contrast, when an element is referred to as being "directly on," "directly engaged to", "directly connected to" or "directly coupled to" another element, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

FIG. 1 depicts a schematic diagram of a gas turbine system 10 according to various embodiments. As shown, the gas turbine system 10 includes a compressor section 12 for compressing an incoming flow of air 14 and for delivering a pressurized flow of compressed air 16 to a combustor section 18. The combustor section 18 mixes the flow of compressed air 16 with a pressurized supply of fuel 20 and ignites the mixture to create a flow of combustion gases 22. Although only a single combustor section 18 is shown, the gas turbine system 10 may include any number of combustor sections 18. The flow of combustion gases 22 is in turn delivered to a turbine section 24. The flow of combustion gases 22 drives the turbine section 24 to produce mechanical work. The mechanical work produced in the turbine section 24 drives the compressor section 12 via a shaft 26 and may be used to drive an external load 28, such as an electrical generator and/or the like.

Figure 2:
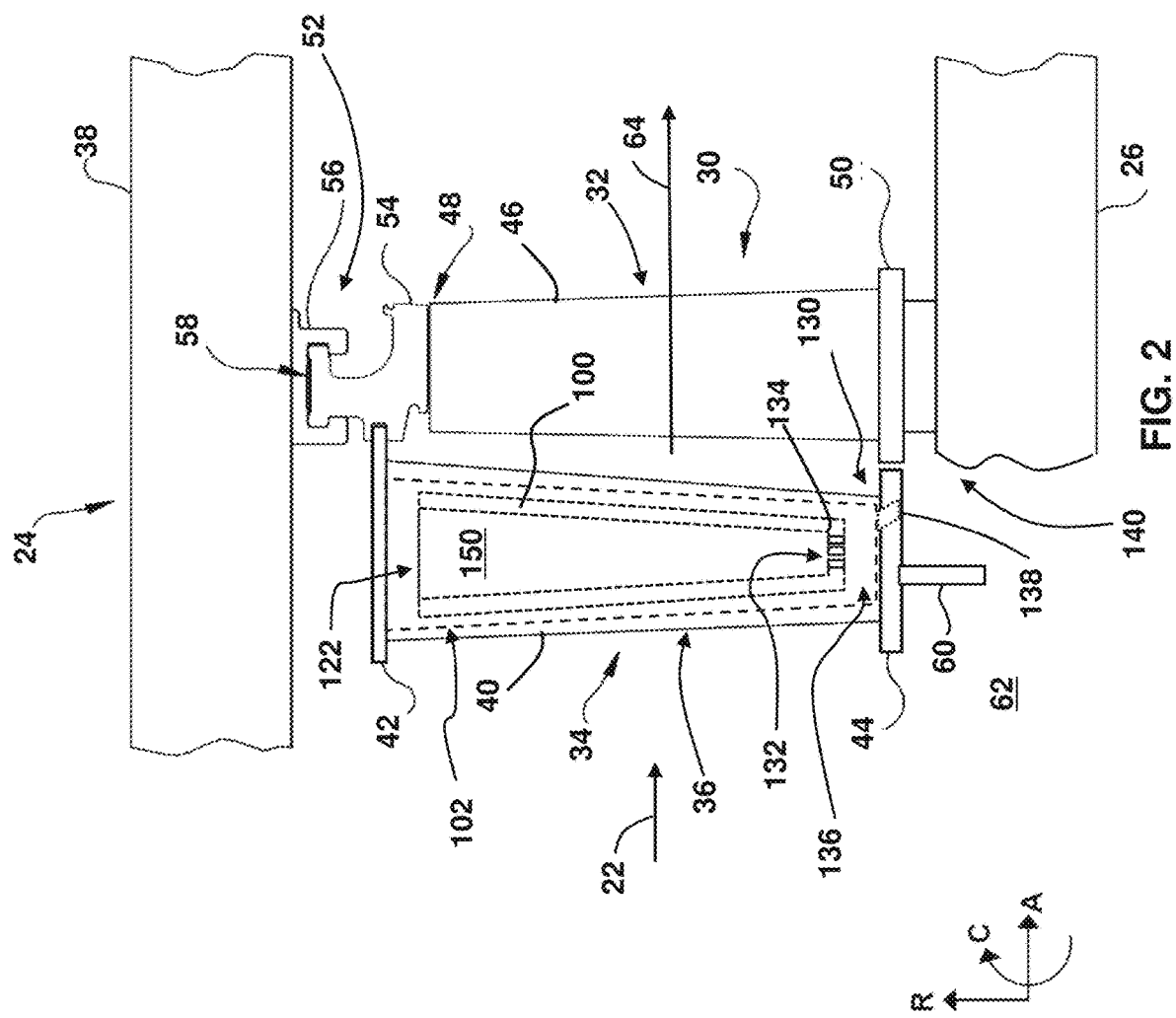
FIG. 2 depicts a side view of a portion of a turbine section of a gas turbine system including a debris ejection circuit, according to embodiments described herein.

FIG. 2 depicts a side view of a portion of a turbine section 24 of a gas turbine system (e.g., gas turbine system 10 of FIG. 1), including at least one turbine stage 30. The turbine stage 30 includes a set of turbine blades 32 (one blade 32 shown) and a corresponding set 34 of nozzles 36 (one nozzle 36 shown) positioned within a casing 38 of the turbine section 24. For example, as depicted in FIG. 2, the stage 30 of turbine blades 32 may be the first stage 30 of turbine blades 32 and nozzles 36 in the turbine section 24. In operation, the set 34 of first stage nozzles 36 is configured to direct a flow of combustion gases 22 onto the turbine blades 32 of the first turbine stage 30. Each nozzle 36 in the first set 34 of nozzles 36 may include an inner chordal hinge seal 60 that is configured to create a seal between the nozzle 36 and an inner support ring (not shown) to separate the high pressure compressed air in the region 62 produced by the compressor section 12 (FIG. 1) and the lower pressure hot combustion gases 22 flowing along the hot gas path 64 into the turbine blades 32 of the first stage 30 in the turbine section 24.

Turbine blades 32 of a particular stage (e.g., first stage 30) may include a plurality of turbine blades 32, which are coupled to and positioned circumferentially about the rotor 26, and which are driven by the combustion gases 22 produced by a combustor section 18 (FIG. 1) of a gas turbine system. The set 34 of nozzles 36 in the first stage 30 includes a plurality of stationary nozzles 36 that are coupled to and positioned circumferentially about the casing 38 of the turbine section 24. In the embodiment shown in FIG. 2, each nozzle 36 may include a vane 40 positioned between an outer platform 42 and an inner platform 44. Similar to the nozzles 36, each turbine blade 32 of the turbine section 24 may include an airfoil 46 extending radially from the rotor 26. Each airfoil 46 may include a tip portion 48 and a platform 50 positioned opposite the tip portion 48.

The turbine blades 32 and the nozzles 36 may be positioned axially adjacent to one another within the casing 38. In FIG. 2, for example, a set 34 of nozzles 36 are shown positioned axially adjacent and upstream of a set of turbine blades 32 in the turbine stage 30. The turbine section 24 may include a plurality of stages 30 of turbine blades 32 and nozzles 36, which are positioned axially throughout the casing 38.

The turbine section 24 of the gas turbine system 10 may include a plurality of stages 52 of shrouds 54 (one stage shown in FIG. 2) positioned axially throughout the casing 38. In FIG. 2, for example, a stage 52 of shrouds 54 is shown positioned radially adjacent to and substantially surrounding or encircling the turbine blades 32 of the turbine stage 30. The stage 52 of shrouds 54 may also be positioned axially adjacent and/or downstream of the set 34 of nozzles 36. Further, the stage 52 of shrouds 54 may be positioned between two adjacent sets 34 of nozzles 36 located on opposing sides of the turbine blades 32 of the turbine stage 30. The stage 52 of shrouds 54 may be coupled about the casing 38 of the turbine section 24 using a set of extensions 56, each including an opening 58 configured to receive a corresponding section of a shroud 54.

Figure 3:
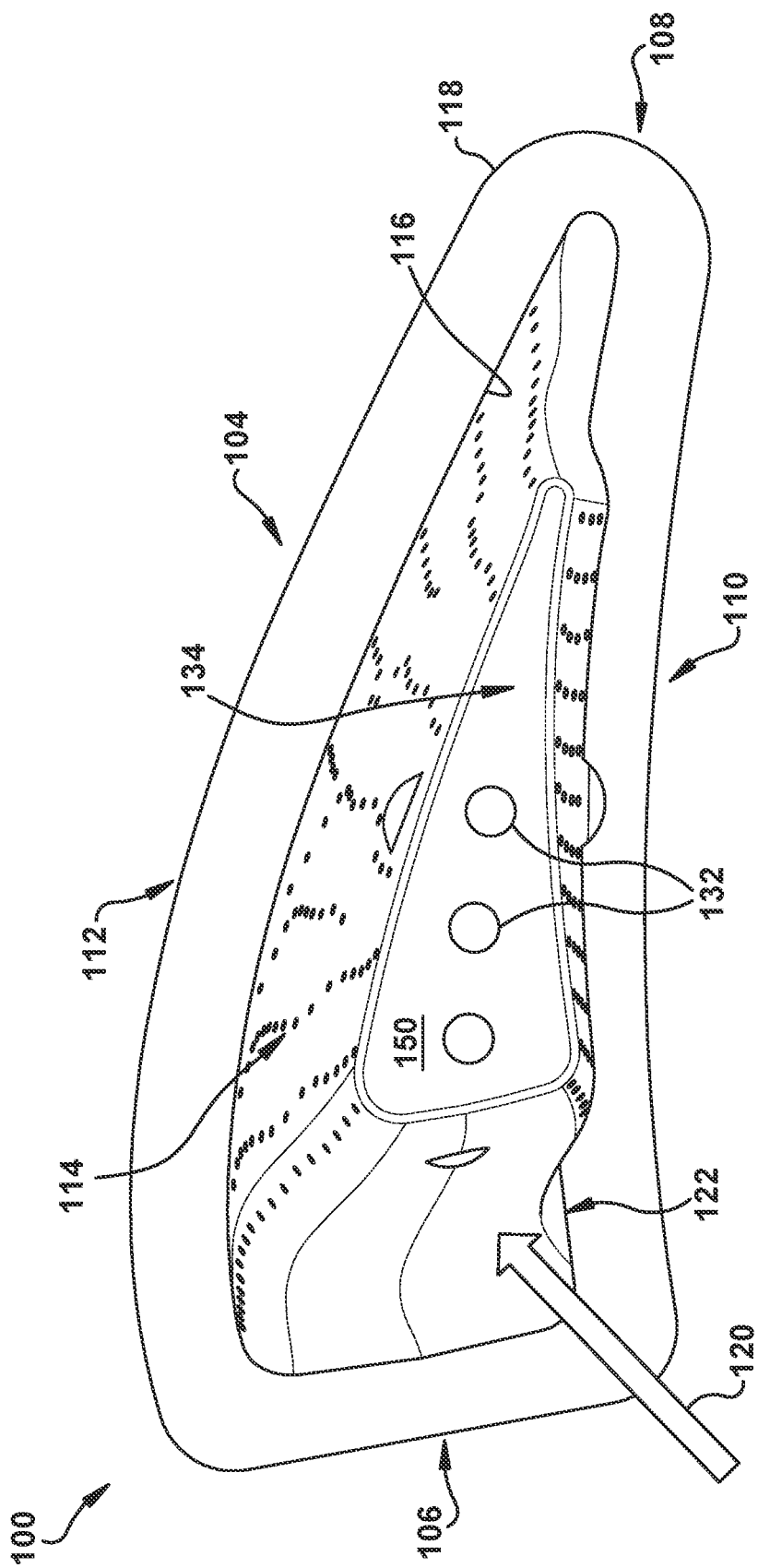
FIG. 3 depicts a perspective view of an impingement insert, according to embodiments described herein.
Figure 4:
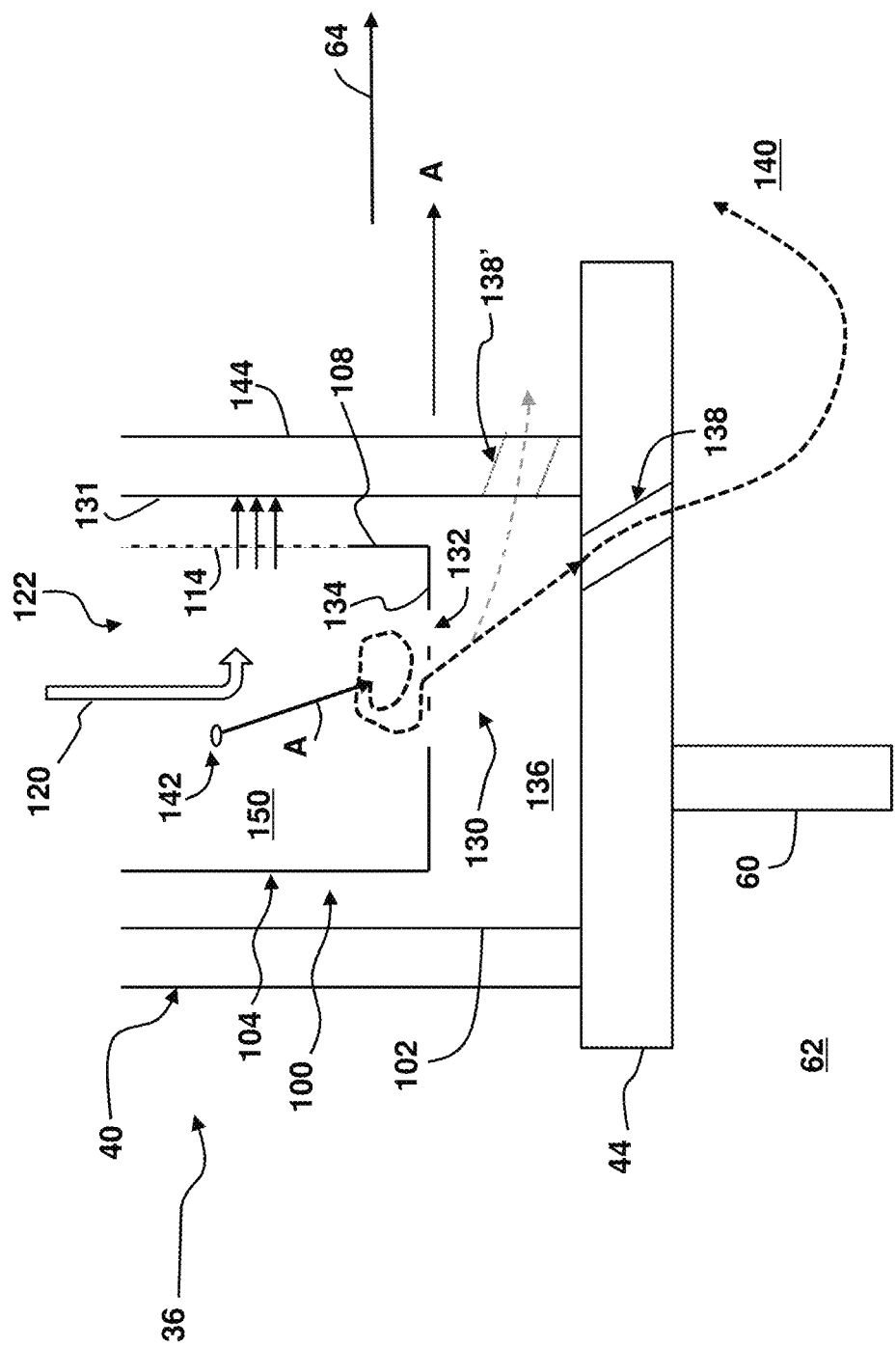
FIG. 4 schematically depicts an enlarged view of a debris ejection circuit and its operation, according to embodiments described herein.

Referring to FIGS. 2-4, an impingement insert 100 may be positioned within a cavity 102 formed in a vane 40 of at least one nozzle 36 of at least one set 34 of nozzles 36 in the turbine section 24. As shown in detail in FIG. 3, the impingement insert 100 may include a body 104 having a leading edge wall 106, a trailing edge wall 108, and first and second sidewalls 110, 112 extending between the leading edge wall 106 and trailing edge wall 108 of the body 104. A plurality of distribution holes 114 may be formed through one or more of leading edge wall 106, trailing edge wall 108, first side wall 110, and/or second side wall 112, and may extend from an interior surface 116 of the impingement insert 100 to an exterior surface 118 of the impingement insert 100. A pressurized flow of cooling air 120, which may be provided by bleeding off a portion of the compressed air 16 discharged by the compressor section 12 of a gas turbine system 10 (FIG. 1), may be directed through an opening 122 into an interior 150 of the impingement insert 100.

A debris ejection circuit 130 according to the present disclosure will now be described with regard to FIGS. 2-4. At least one nozzle 36 in the set 34 of nozzles 36 (e.g., the nozzles 36 of the first stage 30 of the turbine section 24) may include a debris ejection circuit 130. As shown, the debris ejection circuit 130 may include at least one bypass aperture 132 extending through a bottom (e.g., end) wall 134 of the impingement insert 100 for fluidly coupling the interior 150 of the impingement insert 100 and a bottom (e.g., end) section 136 of the cavity 102 disposed below the impingement insert 100. The debris ejection circuit 130 may further include an ejection channel 138 (FIGS. 2 and 4) extending through the inner platform 44 of the nozzle 36 and fluidly coupling the bottom section 136 of the cavity 102 disposed below the impingement insert 100 and a wheelspace cavity 140 of the turbine section 24.

During operation of the gas turbine system 12 (FIG. 1), small particles (e.g., rust flakes from the casings of the compressor section, sand, etc.) contained in the cooling air 120 entering the impingement insert 100 may accumulate in and potentially block the small distribution holes 114 in the walls 106, 108, 110, and/or 112 of the impingement insert 100. Such blockage may reduce the cooling efficiency of the impingement insert 100 and may lead to oxidation or other damage to portions of impingement insert 100. Advantageously, such debris is removed from the impingement insert 100 by the debris ejection circuit 130 according to the present embodiments.

FIG. 4 depicts an enlarged view of a debris ejection circuit 130 and its operation. In the embodiment shown in FIG. 4, the debris ejection circuit 130 may be provided in a nozzle 36 of a first set 34 of nozzles 36 in the first turbine stage 30. The impingement insert 100 in this embodiment provides impingement cooling to an aft end 131 of the cavity 102 via a plurality of distribution holes 114 formed in the trailing edge wall 108 of the impingement insert 100. To this extent, a flow of cooling air 120 entering the impingement insert 100 will flow downward into the interior 150 of the impingement insert 100 and toward the plurality of distribution holes 114 formed in the trailing edge wall 108 of the body 104 of the impingement insert 100.

The debris ejection circuit 130 may include at least one bypass aperture 132 (three bypass apertures 132 are depicted in the illustrated embodiment) extending through the bottom wall 134 of the impingement insert 100. Each bypass aperture 132 is configured to fluidly couple an interior 150 of the impingement insert 100 and a bottom section 136 of the cavity 102 disposed below the impingement insert 100. According to embodiments, each bypass aperture 132 may have a diameter that is larger than the size (e.g., width, diameter, etc.) of any debris 142 that may be expected to enter the impingement insert 100 during operation of the gas turbine system. For example, in a non-limiting example, a bypass aperture 132 may have a diameter of about 0.10 inches to about 0.15 inches (about 2.54 mm to about 3.91 mm). Although three bypass apertures 132 are illustrated in FIGS. 2-4, a smaller or larger number of bypass apertures 132 may be used. Further, the bypass apertures 132 may all have the same diameter, or the bypass apertures 132 may have two or more different diameters.

As shown in FIG. 4, a flow of cooling air 120 may transport (e.g., carry) debris 142 into the interior 150 of the impingement insert 100. The momentum of the debris 142 (e.g., due to the velocity of the flow of cooling air 120) is sufficiently high such that the debris 142 will not be redirected into the distribution holes 114 formed in the trailing edge wall 108 of the body 104 of the impingement insert 100, but will instead travel toward the bottom wall 134 of the impingement insert 100. The debris 142 may recirculate for a short time at the bottom of the impingement insert 100 before passing through a bypass aperture 132 in the bottom wall 134 of the impingement insert 100 into the bottom section 136 of the cavity 102.

As depicted in FIG. 4, cooling air 120 flows into the interior 150 of the impingement insert 100 and into and through the distribution holes 114 formed in the trailing edge wall 108 of the body 104 of the impingement insert 100. To this extent, debris 142 may be deflected by the flow of cooling air 120 toward the trailing edge wall 108 as the debris 142 travels toward the bottom wall 134 of the impingement insert 100. According to embodiments, the bypass apertures 132 may be positioned in the bottom wall 134 toward (e.g., as close as possible) the trailing edge wall 108 of the body 104 of the impingement insert 100 to increase the probability that debris 142 will be captured by and pass through a bypass aperture 132 into the bottom section 136 of the cavity 102.

The debris ejection circuit 130 may further include an ejection channel 138 extending through the inner platform 44 of the nozzle 36. The ejection channel 138 fluidly couples the bottom section 136 of the cavity 102 disposed below the impingement insert 100 and a wheelspace cavity 140 of the turbine section 24. The ejection channel 138 may have diameter greater than or equal to the diameter of the bypass apertures 132.

According to various embodiments, the ejection channel 138 may be positioned aft of the bypass apertures 132 (e.g., downstream in the direction indicated by arrow A) to facilitate the ejection of debris 142 from the bottom section 136 of the cavity 102. Further, the ejection channel 138 may extend at an angle through the platform 44 of the nozzle 36 toward a trailing edge 144 of the nozzle 36 to facilitate the ejection of debris 142. In other embodiments, the ejection channel 138 may extend perpendicularly through the platform 44 of the nozzle 36. When used in a first stage nozzle 36, the ejection channel 138 may be positioned aft of the inner chordal hinge seal 60 to allow the debris 142 to flow into the wheelspace cavity 140 of the turbine section 24. In an alternate embodiment, depicted in phantom in FIG. 4, an ejection channel 138' may be formed in the trailing edge wall 144 of the nozzle 36 to eject debris 142 directly into the hot gas path 64 instead of into the wheelspace cavity 140.

A pressure differential exists across the ejection channel 138 that draws the debris 142 out of the bottom section 136 of the cavity 102 and into the wheelspace cavity 140 of the turbine section 24. For example, according to embodiments described herein, the pressure within the bottom section 136 of the cavity 102 due to the flow of cooling air 120 entering the impingement insert 100 is greater than the pressure within the wheelspace cavity 140. This pressure differential creates a flow of air through the ejection channel 138 that propels the debris 142 out of the bottom section 136 of the cavity 102 and into the wheelspace cavity 140. From the wheelspace cavity 140, the debris 142 may flow into the hot gas path 64 of the turbine section 24 and ultimately out of the gas turbine system.

According to some embodiments, the pressure ratio across the ejection channel 138 may be in the range of about 1.1 to about 1.8. However, the pressure ratio may vary based on, for example, the number, placement, and/or diameter of the bypass apertures 132; the placement, angle, and/or diameter of the ejection channel 138; and/or other factors (e.g., the flow volume of the cooling air 120, the pressure within the wheelspace cavity 140, etc.).

Figure 5:
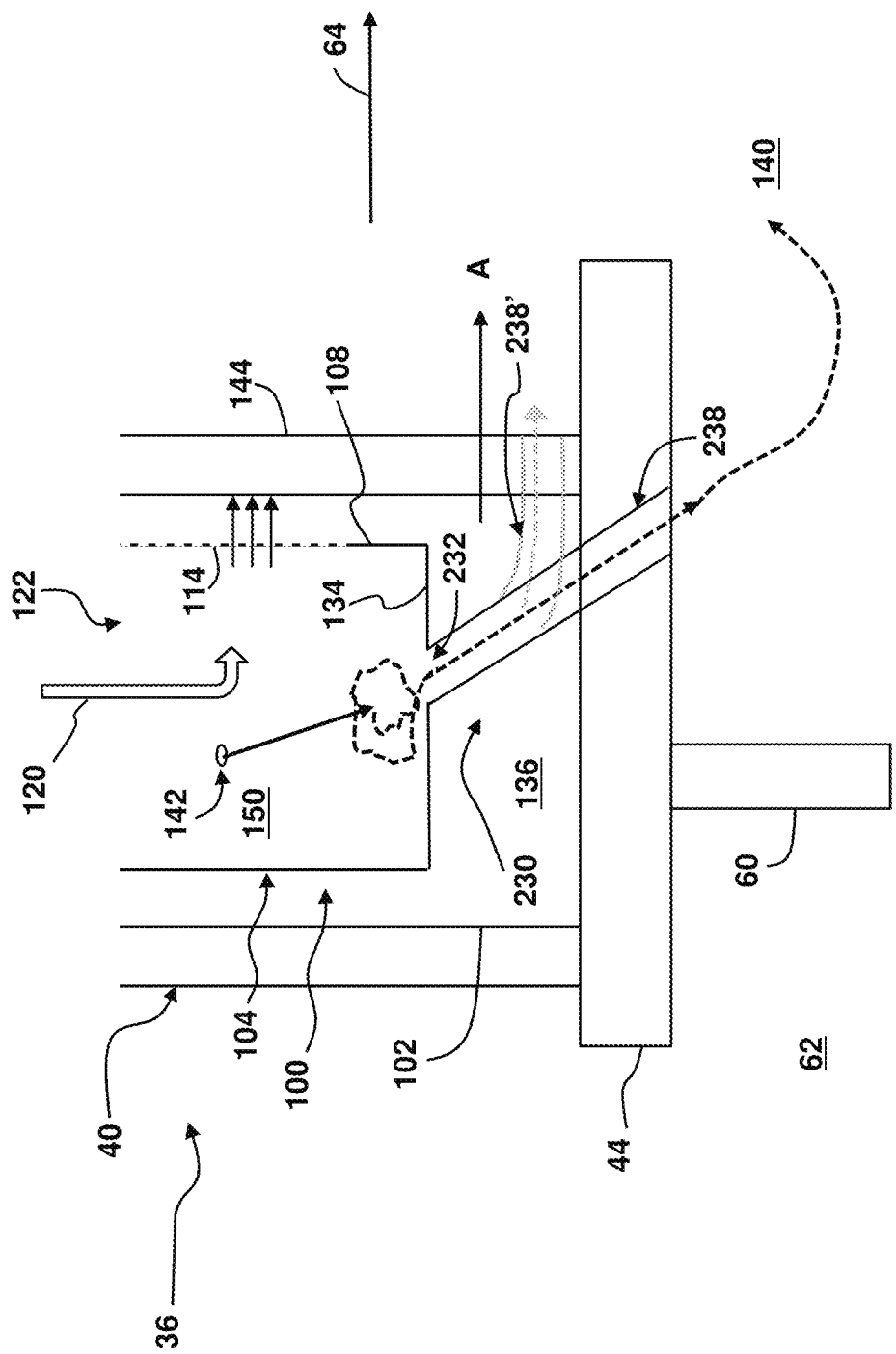
FIG. 5 schematically depicts an enlarged view of a debris ejection circuit and its operation, according to additional embodiments described herein.

FIG. 5 depicts an enlarged view of a debris ejection circuit 230 and its operation according to additional embodiments. As previously described with regard to the embodiment depicted in FIG. 4, debris 142 passes: 1) through a bypass aperture 132 in the bottom wall 134 of the impingement insert 100 into the bottom section 136 of the cavity 102; and 2) from the bottom section 136 of the cavity 102 to the wheelspace cavity 140 through the ejection channel 138. As shown in FIG. 5, however, the debris ejection circuit 230 may include an ejection channel 238 that is configured as a tubular structure extending from the bottom of the impingement insert 100 to directly fluidly couple the impingement insert 100 (via a bypass aperture 232) and the wheelspace cavity 140 for removal of debris 142.

The debris ejection circuit 230 may include at least one bypass aperture 232 extending through the bottom wall 134 of the impingement insert 100. If multiple bypass apertures 232 are used, all of the bypass apertures 232 may be fluidly coupled to the same ejection channel 238. According to such embodiments, a bypass aperture 232 may have a diameter that is larger than the size (e.g., width, diameter, etc.) of any debris 142 that may be expected to enter the impingement insert 100 during operation of the gas turbine system. For example, in a non-limiting example, the bypass aperture 232 may have a diameter of about 0.10 inches to about 0.15 inches (about 2.54 mm to about 3.91 mm). Although one bypass aperture 232 is depicted in FIG. 5, a larger number of bypass apertures 232 may be used. Further, the bypass apertures 232 may all have the same diameter, or the bypass apertures 232 may have two or more different diameters. The ejection channel 238 may have diameter greater than or equal to the diameter of the bypass aperture 232.

As shown in FIG. 5, a flow of cooling air 120 may transport debris 142 into the interior 150 of the impingement insert 100. Again, the momentum of the debris 142 is sufficiently high such that the debris 142 will not be redirected into the distribution holes 114 formed in the walls of the impingement insert 100, but will instead travel toward the bottom wall 134 of the impingement insert 100. The debris 142 may recirculate for a short time at the bottom of the impingement insert 100 before passing through the bypass aperture 232 in the bottom wall 134 of the impingement insert 100 and into the ejection channel 238.

A pressure differential exists across the ejection channel 238 that is configured to draw the debris 142 through the ejection channel 238 and into the wheelspace cavity 140 of the turbine section 24. For example, according to embodiments, the pressure within the impingement insert 100 due to the flow of cooling air 120 entering the impingement insert 100 is greater than the pressure within the wheelspace cavity 140. This pressure differential creates a flow of air through the ejection channel 238 that propels the debris 142 into a bypass aperture 232, through the ejection channel 238, and into the wheelspace cavity 140. From the wheelspace cavity 140, the debris 142 may flow into the hot gas path 64 of the turbine section 24 and ultimately out of the gas turbine system. In an alternate embodiment, depicted in phantom in FIG. 5, an ejection channel 238' may be formed in the trailing edge wall 144 of the nozzle 36 to eject debris 142 directly into the hot gas path 64 instead of into the wheelspace cavity 140.

According to various embodiments, the ejection channel 238 may extend at an angle through the platform 44 of the nozzle 36 toward a trailing edge 144 of the nozzle 36 to facilitate the ejection of debris 142. In other embodiments, the ejection channel 238 may extend perpendicularly through the platform 44 of the nozzle 36. When used in a first stage nozzle 36, the ejection channel 238 may be positioned aft of the inner chordal hinge seal 60 to allow the debris 142 to flow into the wheelspace cavity 140 of the turbine section 24.

Various components of the present disclosure may be formed using an additive manufacturing process. Advantageously, additive manufacturing enables the design and production of more customizable and intricate features.

As used herein, additive manufacturing may include any process of producing an object through the successive layering of material rather than the removal of material, which is the case with conventional processes. Additive manufacturing can create complex geometries without the use of any sort of tools, molds or fixtures and with little or no waste material. Instead of machining components from solid billets of plastic or metal, much of which is cut away and discarded, the only material used in additive manufacturing is what is required to shape the part. Additive manufacturing processes may include but are not limited to: 3D printing, rapid prototyping (RP), direct digital manufacturing (DDM), binder jetting, selective laser sintering (SLS), selective laser melting (SLM), direct metal laser sintering (DMLS), and direct metal laser melting (DMLM). In the current setting, DMLM or SLM have been found advantageous.

The terminology used herein is for the purpose of describing particular embodiments only and is not intended to be limiting of the disclosure. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A gas turbine component with an ejection circuit for removing debris from cooling air flowing through the gas turbine component, comprising:
   an impingement insert disposed within a cavity in the gas turbine component, the impingement insert including an end wall and a plurality of distribution holes for directing cooling air against a wall of the cavity; and
   a debris ejection circuit, including:
      a bypass aperture defined in the end wall of the impingement insert, the bypass aperture fluidly coupling an interior of the impingement insert and an end section of the cavity; and
      an ejection channel defined in an aft section of the gas turbine component, the ejection channel fluidly coupling the end section of the cavity and a wheelspace cavity, the wheelspace cavity being radially inward of the gas turbine component, wherein the ejection channel is positioned aft of the bypass aperture and adjacent a trailing edge of the gas turbine component;
   wherein a pressure differential between the interior of the gas turbine component and the wheelspace cavity directs debris in the cooling air through the bypass aperture and the ejection channel to the wheelspace cavity.

2. The gas turbine component according to claim 1, wherein the gas turbine component comprises a nozzle of the gas turbine system.

3. The gas turbine component according to claim 2, wherein the nozzle comprises a nozzle in a first stage of a turbine of the gas turbine system.

4. The gas turbine component according to claim 2, wherein the ejection channel passes through a platform of the nozzle to the wheelspace cavity; and wherein the ejection channel is angled toward a downstream end of the nozzle.

5. The gas turbine component according to claim 4, wherein the ejection channel has an outlet into the wheelspace cavity downstream of an inner chordal hinge seal of the nozzle.

6. The gas turbine component according to claim 2, wherein the plurality of distribution holes for directing cooling air against a wall of the cavity are formed in a trailing edge wall of the impingement insert, and wherein the bypass aperture defined in the end wall of the impingement insert is positioned adjacent the trailing edge wall of the impingement insert.

7. The gas turbine component according to claim 1, further comprising a plurality of the bypass apertures in the end wall of the impingement insert, wherein the ejection channel is positioned aft of the plurality of bypass apertures.

8. The gas turbine component according to claim 1, wherein the bypass aperture has a diameter of 2.54 mm to 3.91 mm.

9. The gas turbine component according to claim 1, wherein the ejection channel has a diameter greater than or equal to a diameter of the bypass aperture.

10. The gas turbine component according to claim 1, wherein a pressure ratio between the interior of the gas turbine component and the wheelspace cavity is 1.1 to 1.8.

11. A gas turbine component having an ejection circuit for removing debris from cooling air flowing through a gas turbine system, the gas turbine component comprising:
    an impingement insert disposed within a cavity in the gas turbine component, the impingement inserts including an end wall and a plurality of distribution holes for directing cooling air against a wall of the cavity; and
    a debris ejection circuit, including:
       a bypass aperture defined in the end wall of the impingement insert, the bypass aperture fluidly coupling an interior of the impingement insert and an end section of the cavity; and
       an ejection channel defined in an aft section of the gas turbine component, the ejection channel fluidly coupling the impingement insert and a hot gas path at an exterior of the gas turbine component via the bypass aperture, wherein the ejection channel is positioned aft of the bypass aperture and is formed through a trailing edge of the gas turbine component;
    wherein a pressure differential between the interior of the impingement insert and the exterior of the gas turbine component directs debris in the cooling air through the bypass aperture and the ejection channel to the hot gas path at the exterior of the gas turbine component, and wherein the gas turbine component comprises a nozzle of the gas turbine system.

12. The gas turbine component according to claim 11, wherein the nozzle comprises a nozzle in a first stage of a turbine of the gas turbine system.

13. The gas turbine component according to claim 11, wherein the plurality of distribution holes for directing cooling air against a wall of the cavity are formed in a trailing edge wall of the impingement insert, and wherein the bypass aperture defined in the end wall of the impingement insert is positioned adjacent the trailing edge wall of the impingement insert.

14. The gas turbine component according to claim 11, wherein the bypass aperture has a diameter of 2.54 mm to 3.91 mm.

15. The gas turbine component according to claim 11, wherein the ejection channel has a diameter greater than or equal to a diameter of the bypass channel.

16. The gas turbine component according to claim 11, wherein a pressure ratio between the interior of the gas turbine component and the hot gas path at the exterior of the gas turbine component is 1.1 to 1.8.

* * * * *